(12) United States Patent
Yu (10) Patent No.: US 9,217,893 B2
(45) Date of Patent: Dec. 22, 2015

(54) LIGHT BAR AND BACKLIGHT MODULE

(71) Applicant: AmTRAN Technology Co., Ltd., New Taipei (TW)

(72) Inventor: Hung-Ta Yu, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 294 days.

(21) Appl. No.: 14/017,299

(22) Filed: Sep. 3, 2013

(65) Prior Publication Data

US 2014/0369026 A1  Dec. 18, 2014

(30) Foreign Application Priority Data

Jun. 17, 2013 (TW) ............... 102121392 A (51) Int. Cl.
 *F21V 29/00* (2015.01)
 *G02F 1/1335* (2006.01)

(52) U.S. Cl.
 CPC ........ *G02F 1/1336* (2013.01); *G02F 1/133603* (2013.01); *G02F 2001/133628* (2013.01)

(58) Field of Classification Search
 CPC ..... F21V 29/002; F21V 29/70; H01L 23/367; H01L 23/36; H01L 33/642; G02F 1/133602; G02F 1/133603; G02F 2001/133628
 USPC .................. 362/97.1, 97.3, 218, 373; 165/185
 See application file for complete search history.

(56) References Cited

U.S. PATENT DOCUMENTS

| | | | |
|---|---|---|---|
| 5,660,917 A * | 8/1997 | Fujimori et al. | 428/195.1 |
| 5,944,097 A * | 8/1999 | Gungor et al. | 165/185 |
| 9,049,780 B2 * | 6/2015 | Na | |
| 2011/0156083 A1 * | 6/2011 | Wang et al. | 257/99 |

\* cited by examiner

*Primary Examiner* — Karabi Guharay
(74) *Attorney, Agent, or Firm* — CKC & Partners Co., Ltd.

(57) ABSTRACT

A light bar includes a wiring substrate, a plurality of light sources, and at least one high efficient heat-dissipating component. The wiring substrate has a first surface and a second surface opposite to the first surface. The second surface is divided into at least one high efficient heat-dissipating section and at least one low efficient heat-dissipating section. The light sources are respectively disposed on the first surface opposite to the high efficient heat-dissipating section and the low efficient heat-dissipating section. The high efficient heat-dissipating component is disposed on the high efficient heat-dissipating section.

18 Claims, 5 Drawing Sheets

LIGHT BAR AND BACKLIGHT MODULE

RELATED APPLICATIONS

This application claims priority to Taiwanese Application Serial Number 102121392, filed Jun. 17, 2013, which is herein incorporated by reference.

BACKGROUND

1. Field of Invention

The present disclosure relates to a light bar. More particularly, the present disclosure relates to a light bar in a direct type backlight module.

2. Description of Related Art

An LED (light-emitting diode) back-lit LCD (liquid crystal display) display is a flat panel display which uses LEDs as a backlight source. LED back-lit techniques can be categorized as direct back-lit (or full LED array back-lit) technique and edge-lit technique. The direct back-lit technique arranges a plurality of LEDs into an array and disposes the array behind optical films and an liquid crystal panel for directly illuminating the liquid crystal panel. Therefore, once the direct back-lit technique is adopted, brightness of different LEDs can be fine-tuned instantly according to gray scale variations of different parts in an image picture, and the dynamic contrast ratio is greatly enhanced, even to the standard of plasma displays.

Because applicable width of a fiber glass-reinforced epoxy laminate (for example, RF4 laminate) is much wider, it becomes a preferred substrate material of light bars in direct type backlight modules. However, due to its lower heat-dissipating coefficient, heat-dissipating conditions of different areas on a light bar substrate are inconsistent, so that thermal deformations of different areas on the substrate are different as well, which finally results in bending of the substrate.

Moreover, bending of the substrate further induces the LEDs to deviate from originally designed positions and deflects illuminating directions of the LEDs. Therefore, when the LEDs illuminate the liquid crystal panel for displaying picture images, inhomogeneous brightness of the picture images is shown, which then results in mura phenomena exhibiting traces or shadows.

SUMMARY

This disclosure provides a light bar to reduce temperature differences among different areas of the light bar by a specially designed heat-dissipating structure, so as to avoid bending of substrate.

According to one embodiment of the present disclosure, a light bar includes a wiring substrate, a plurality of light sources, and at least one high efficient heat-dissipating component. The wiring substrate has a first surface and a second surface opposite to the first surface. The second surface is divided into at least one high efficient heat-dissipating section and at least one low efficient heat-dissipating section. The light sources are respectively disposed on the first surface opposite to the high efficient heat-dissipating section and the low efficient heat-dissipating section. The high efficient heat-dissipating component is disposed on the high efficient heat-dissipating section.

In one or more embodiments of the present disclosure, the high efficient heat-dissipating component disposed on the high efficient heat-dissipating section is a heat-dissipating film or a copper film.

In one or more embodiments, the light bar further includes a low efficient heat-dissipating component disposed on the low efficient heat-dissipating section. The high efficient heat-dissipating component and the low efficient heat-dissipating component are both heat-dissipating films provided the thickness of the high efficient heat-dissipating component is greater than that of the low efficient heat-dissipating component.

In one or more embodiments, the high efficient heat-dissipating component and the low efficient heat-dissipating component are both copper films.

In one or more embodiments, a thickness difference between the high efficient heat-dissipating component and the low efficient heat-dissipating component results in a mass difference per square inch, and the mass difference is approximately smaller than one ounce.

In one or more embodiments, the second surface has a plurality of low efficient heat-dissipating sections. The light sources are disposed in a row, and the light sources at opposite ends of the row are respectively disposed on the first surface opposite to the low efficient heat-dissipating sections.

In one or more embodiments, the second surface has a plurality of high efficient heat-dissipating sections. The light sources are disposed in a row, and the light sources in the middle of the row are respectively disposed on the first surface opposite to the high efficient heat-dissipating sections.

According to another embodiment of the present disclosure, a direct type backlight module is provided and includes a back plate and the previously mentioned light bar. The light bar is disposed on the back plate.

According to a further embodiment of the present disclosure, a direct type backlight module is provided and includes a back plate and the previously mentioned light bar. The back plate has at least one high efficient heat-dissipating portion and at least one low efficient heat-dissipating portion. The light bar is disposed on the back plate. Wherein, the high efficient heat-dissipating portion contacts with the low efficient heat-dissipating section, and the low efficient heat-dissipating portion contacts with the high efficient heat-dissipating section.

In one or more embodiments, the high efficient heat-dissipating portion is made of metal.

In one or more embodiments, the low efficient heat-dissipating portion is made of plastic.

By design of the high efficient heat-dissipating section and the low efficient heat-dissipating section, the disclosed embodiments can respectively adjust heat-dissipating efficiencies of the high efficient heat-dissipating section and the low efficient heat-dissipating section according to characteristics of different back plates, so as to reduce temperature differences between different areas of the light bar. Therefore, substrate bending and inhomogeneous brightness problem on the screen caused by induced deflection of LED illuminating directions can be avoided.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
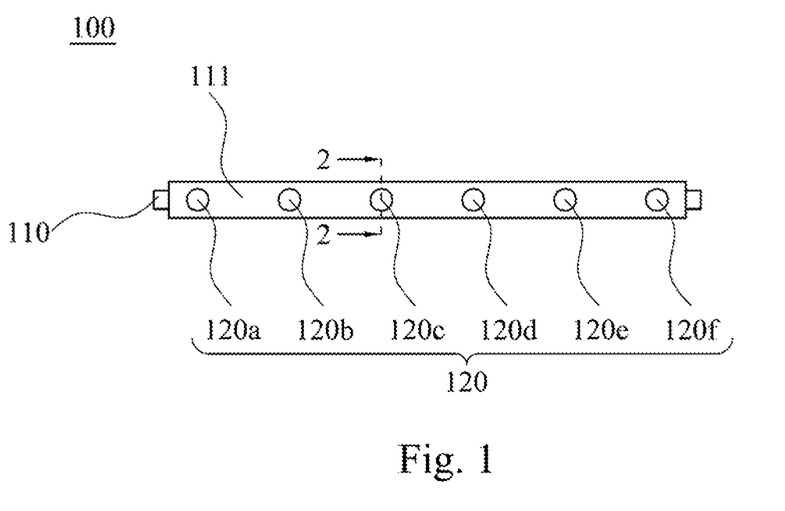
FIG. 1 is a top view of a light bar according to one embodiment of the present disclosure.
Figure 2:
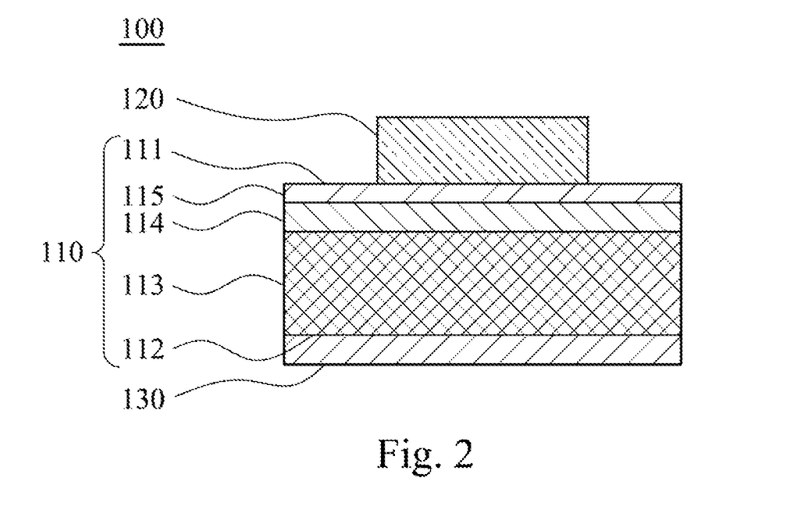
FIG. 2 is a cross-sectional view taken along line 2-2 of FIG. 1.
Figure 3:
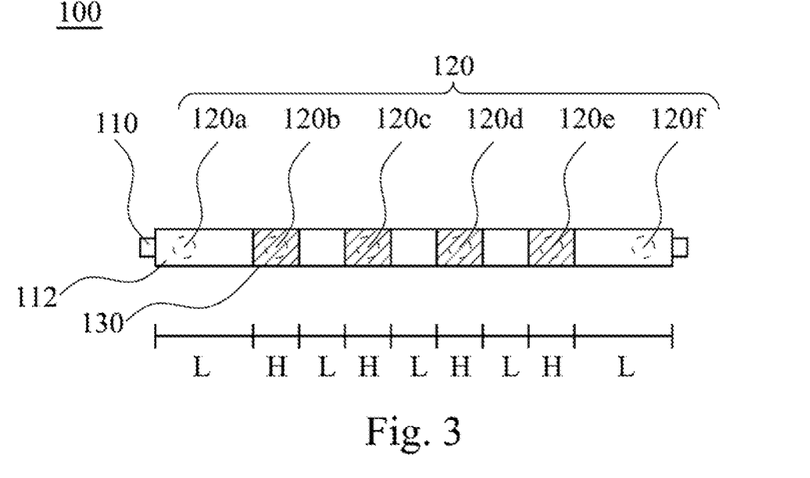
FIG. 3 is a bottom view of the light bar of FIG. 1.

FIG. 1 is a top view of a light bar according to one embodiment of the present disclosure, FIG. 2 is a cross-sectional view taken along line 2-2 of FIG. 1. FIG. 3 is a bottom view of the light bar of FIG. 1. The light bar 100 in this embodiment is mainly used in a direct type backlight module. The direct type backlight module is usually disposed behind a liquid crystal panel for providing a backlight source to illuminate the liquid crystal panel. Light sources in the direct type backlight module can be light-emitting diodes (LED). The LEDs are usually arranged in the form of the light bar, as shown in FIG. 1~FIG. 3.

The light bar 100 can include a wiring substrate 110, a plurality of light sources 120, and at least one high efficient heat-dissipating component 130. The wiring substrate 110 has a first surface 111 and a second surface 112 opposite to the first surface 111. The second surface 112 is divided into at least one high efficient heat-dissipating section H and at least one low efficient heat-dissipating section L. The light sources 120 are respectively disposed on the first surface 111 opposite to the high efficient heat-dissipating section H and the low efficient heat-dissipating section L. Specifically, an orthographic projection of at least one light source 120 onto the second surface 112 (marked as a dotted circle in FIG. 3) can at least partially overlap with the high efficient heat-dissipating section H. The high efficient heat-dissipating component 130 is disposed on the high efficient heat-dissipating section H, so that the heat-dissipating efficiency of the high efficient heat-dissipating section H is better than that of the low efficient heat-dissipating section L.

Because the light sources 120 generate heat, the heat accumulated in the areas near the light sources 120 is usually more than that in the areas far from the light sources 120, which makes thermal deformations near the light sources 120 larger than those in the areas far from the light sources 120. The inconsistent thermal deformations then bend the wiring substrate 110. Therefore, the disclosed embodiment disposes the component 130 on places where heat may accumulate, e. g. the section H, to enhance heat-dissipating efficiency of the section H and balance temperature difference between the section H and the section L, so as to eliminate or reduce bending of the wiring substrate 110.

Specifically, the numbers of the sections H may be a plural number, the numbers of the sections L may be a plural number, and at least a portion of the light sources 120 correspond to the sections H in a one to one manner. More specifically, the light sources 120 include light sources 120a~120f. The light sources 120a~120f can be disposed in a row, and the light sources 120a, 120f at two opposite ends of the row are respectively disposed on the first surface 111 opposite to the section L. That is, orthographic projections of the light sources 120a, 120f at two opposite ends of the row onto the second surface 112 (marked by dotted circles in FIG. 3) can at least partially overlap with the sections L. The light sources 120b, 120c, 120d, 120e in the middle of the row are respectively disposed on the first surface 111 opposite to the section H. That is, orthographic projections of the light sources 120b, 120c, 120d, 120e onto the second surface 112 (marked by dotted circles in FIG. 3) can at least partially overlap with the sections H. The length of the section H can be 16~35 mm.

As shown in FIG. 1, besides yielding heat by themselves, the light sources 120a and 120f receive heat conducted from the light sources 120b and 120e respectively through just one side of the light sources 120a and 120f. In contrast, besides producing heat by themselves, the light sources 120b, 120c, 120d, and 120e receive heat conducted from their neighborhoods respectively through both sides of the light sources 120b, 120c, 120d, and 120e. For example, as to the light source 120b, it creates heat by itself and receives heat conducted from the neighboring light sources 120a and 120c through its both sides. Therefore, the disclosed embodiment chooses to dispose the components 130 on the areas of the second surface 112 opposite to the light sources 120b, 120c, 120d, and 120e, e.g. the sections H, to thereby enhance heat-dissipating capability of local areas and balance temperature differences between the center and the edges of the wiring substrate 110, so as to eliminate or reduce bending of the wiring substrate 110.

In implementing of the disclosed embodiment, the component 130 can be a heat-dissipating film, and there is no heat-dissipating film on the section L. Specifically, the component 130 can be a copper film or a metal film, and there is no copper film or metal film on the section L. However, the present disclosure is not limited to the above description. In other embodiments of the disclosure, a loin efficient heat-dissipating component may exist on the section L.

Figure 4:
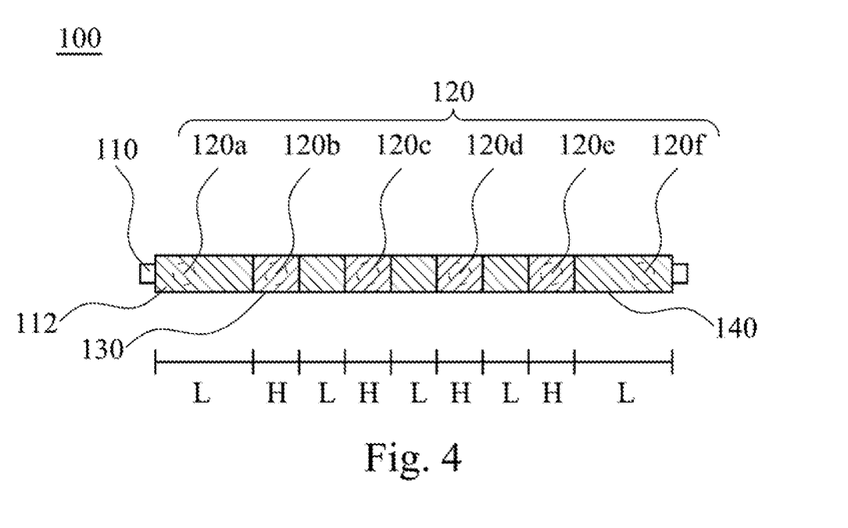
FIG. 4 is a bottom view of a light bar according to another embodiment of the present disclosure.

As shown in FIG. 4, the light bar 100 of FIG. 4 further includes a low efficient heat-dissipating component 140 disposed on the section L. The high efficient heat-dissipating component 130 and the low efficient heat-dissipating component 140 are both heat-dissipating films, such as copper films or metal films provided the thickness of the component 130 is greater than that of the component 140. Hence, the heat efficiency of the section H is better than that of the section L. Specifically, the thickness of the component 130 can be 0.02~0.04 mm, and the thickness of the component 140 can be 0.001~0.02 mm. The thickness difference between the component 130 and the component 140 results in a mass difference per square inch, and the mass difference is approximately smaller than one ounce.

As shown in FIG. 2, the wiring substrate 110 includes a substrate layer 113, an upper metal layer 114, and an insulating layer 115. The substrate layer 113 can be a fiber glass-reinforced epoxy laminate (for example, a FR-4 sheet). The material of the upper metal layer 114 can be copper or other metal. The material of the insulating layer 115 can be an insulating material such as insulating paint, etc.

Figure 5:
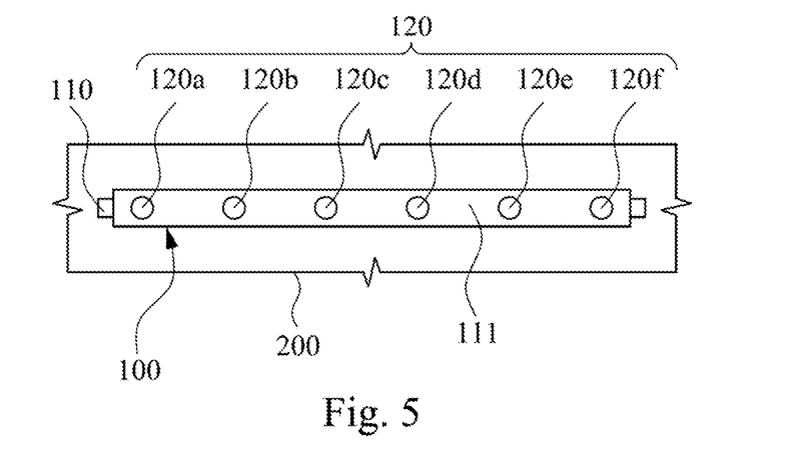
FIG. 5 is a top view of the light bar in FIG. 1 after installed in a direct type backlight module.

FIG. 5 is a top view of the light bar in FIG. 1 after installed in a direct type backlight module. As shown in the FIG. 5, a direct type backlight module includes a back plate 200 and the light bar 100. The material of the back plate 200 can be metal such as iron, copper, etc. The light bar 100 is disposed on the back plate 200. It should be noted that FIG. 5 shows only part of the actual direct type backlight module which may include multiple light bars 100 arranged side by side to form a light source array.

For the embodiments shown in FIG. 1~FIG. 5, experiment data of one embodiment is disclosed in the following description to prove that the light bar 100 shown in FIG. 1~FIG. 5 can certainly reduce the temperature differences between each of the light sources 120. The parameters mentioned in the above embodiments will not be described in the followings.

First, the light bar 100 of FIG. 4 installed in the direct type backlight module was turned on, wherein the components 130 and the components 140 are all copper films. In the present embodiment, the thickness of each component 130 is 0.04 mm, and the thickness of each component 140 is 0.02 mm. The length of each section H is 31 mm. The distinction between the present embodiment and a comparative embodiment is that both the sections H and the sections L on the second surface 112 of the wiring substrate 110 are covered by a copper film with thickness of 0.02 mm. In the present and comparative embodiments, the light sources 120 are LEDs having a model name 3030 and manufactured by Everlight Electronics Co., Ltd., the width and length of the LEDs are both 3 mm, the power of the LEDs is 1.4 W, and the current passing through each LED is 0.4 A. Other parameters such as dimensions, materials and specifications, etc. of both embodiments are identical. After the light sources 120 had been turned on and in a thermal equilibrium, core temperatures and pin temperatures of the light sources 120 were recorded in the following table 1:

cient heat-dissipating section L. The light sources 120 are respectively disposed on the first surface 111 opposite to the high efficient heat-dissipating section H and the low efficient heat-dissipating section L. Specifically, an orthographic projection of at least one of the light sources 120 on the second surface 112 (marked by a dotted circle in FIG. 7) can at least partially overlap with the low efficient heat-dissipating section L. The high efficient heat-dissipating component 130 is disposed on the high efficient heat-dissipating section H, so that the heat-dissipating efficiency of the high efficient heat-dissipating section H is better than that of the low efficient heat-dissipating section L.

Figure 8:
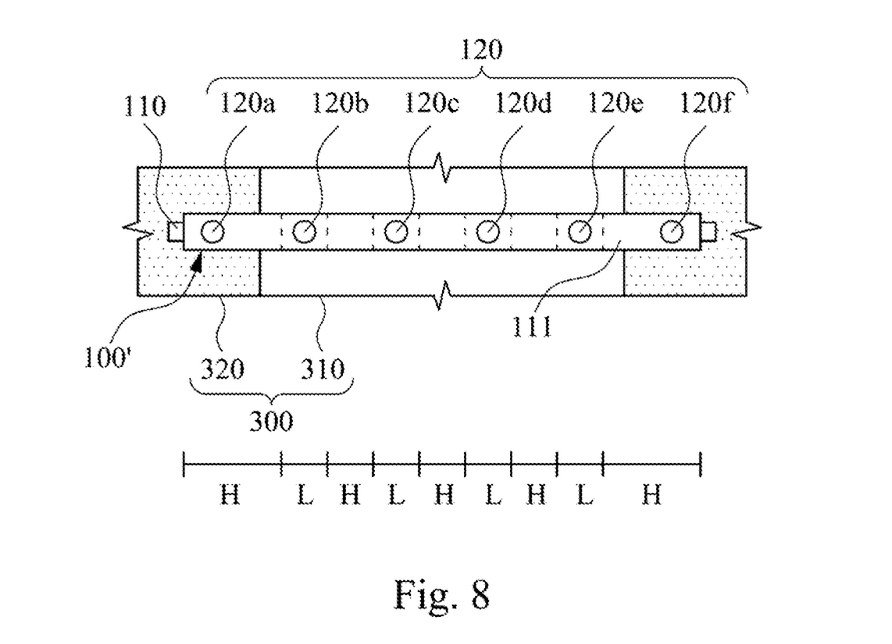
FIG. 8 is a top view of the light bar in FIG. 6 after installed in the direct type backlight module.

FIG. 8 is a top view of the light bar in FIG. 6 after installed in a direct type backlight module. As illustrated in the FIG. 8, the direct type backlight module includes a back plate 300 and the previously described light bar 100'. The back plate 300 has at least one high efficient heat-dissipating portion 310 and at least one low efficient heat-dissipating portion 320. The heat-dissipating efficiency of the high efficient heat-dissipating portion 310 is better than that of the low efficient heat-dissipating portion 320. The light bar 100' is disposed on the back plate 300.

The portion 310 contacts the section L, and the portion 320 contacts the section H. Specifically, orthographic projections of the light sources 120, such as the light sources 120b, 120c, 120d, and 120e, disposed above the portion 310 onto the second surface 112 (marked by dotted circles in FIG. 7) at least partially overlap with the sections L. Orthographic projections of the light sources 120, such as the light sources

TABLE 1

| The core temperatures and pin temperatures of the light sources 120 | | | | | | | |
|---|---|---|---|---|---|---|---|
| | | Light Source 120a | Light Source 120b | Light Source 120e | Light Source 120f | Environment Temperature (° C.) | Total Voltage (V) |
| Comparative Embodiment | Core Temperature (° C.) | 68.1 | 74.3 | 73.1 | 67.8 | 23 | 20.87 |
| | Pin Temperature (° C.) | 84.9 | 91.1 | 89.9 | 84.6 | | |
| | Temperature Difference (° C.) | | −6.2 | −5.3 | | | |
| Present Embodiment | Core Temperature (° C.) | 68.1 | 70.2 | 70 | 67.8 | 22.6 | 20.92 |
| | Pin Temperature (° C.) | 84.9 | 87 | 86.8 | 84.6 | | |
| | Temperature Difference (° C.) | | −2.1 | −2.2 | | | |

Table 1 shows that the above embodiments can actually reduce the temperature differences between each of the light sources 120. Therefore, the bending problem of the wiring substrate 110 resulted from inhomogeneous thermal deformations can definitely be improved.

Figure 6:
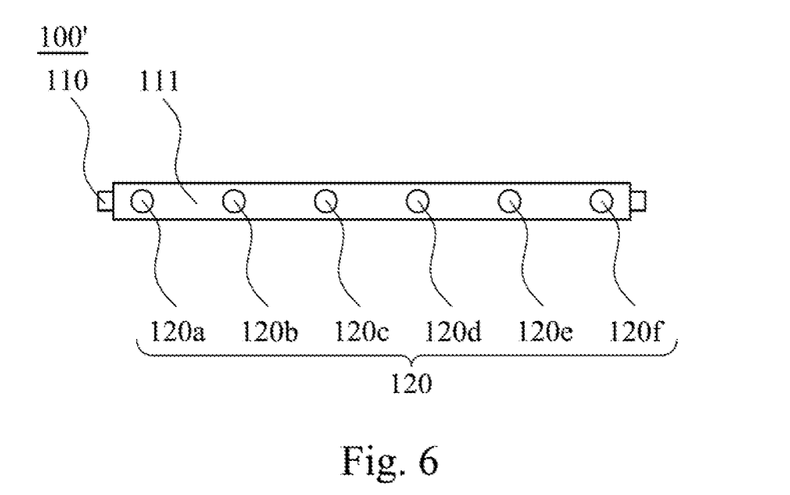
FIG. 6 is a top view of a light bar according to a further embodiment of the present disclosure.
Figure 7:
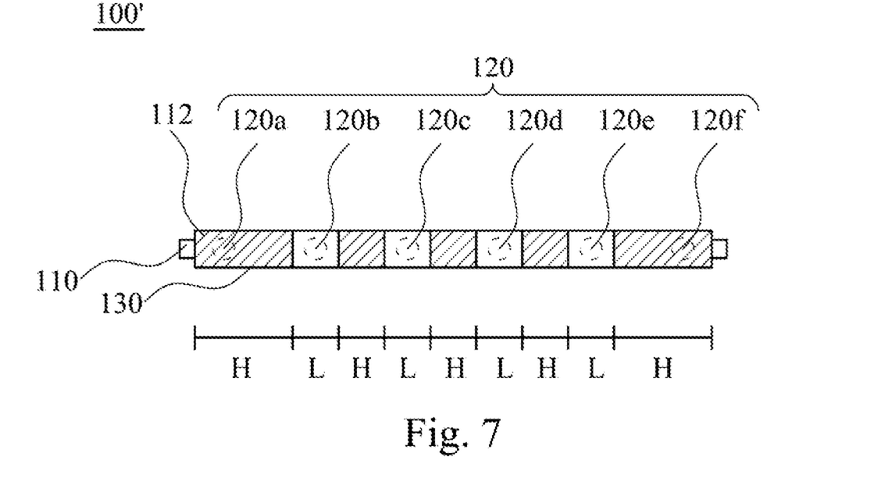
FIG. 7 is a bottom view of the light bar in FIG. 6.

FIG. 6 is a top view of a light bar according to a further embodiment of the present disclosure. FIG. 7 is a bottom view of the light bar in FIG. 6. As shown in the figures, the light bar 100' includes a wiring substrate 110, a plurality of light sources 120 and at least one high efficient heat-dissipating component 130. The wiring substrate 110 has a first surface 111 and a second surface 112 opposite to the first surface 111. The second surface 112 is divided into at least one high efficient heat-dissipating section H and at least one low effi- 120a and 120f, disposed above the portions 320 onto the second surface 112 (marked by dotted circles in FIG. 7) at least partially overlap with the sections H. It should be noted that FIG. 8 shows only part of the actual direct type backlight module which may include multiple the light bars 100' arranged side by side to form a light source array.

When the back plate 300 having the portion 310 and 320 is used, the temperature inhomogeneity of the light bar 100' will be intensified. The light sources 120 disposed above the portions 320, such as the light sources 120a and 120f, will become hotter due to the poor heat-dissipating efficiency. The light sources 120 disposed above the portion 310, such as the light sources 120b, 120c, 120d, and 120e, will become cooler due to the better heat-dissipating efficiency. Therefore, the present embodiment sets the light sources 120 above the portion 310, such as 120b, 120c, 120d, 120e, to overlap with the section L, and sets the light sources 120 above the portions 320, such as 120a, 120f, to overlap with the section H, for balancing heat-dissipating efficiencies and lowering temperature differences between different areas.

The material of the portion 310 can be metal such as iron, copper, etc. The material of the portion 320 can be plastic, etc. It should be understood that the above illustrated materials of the portions 310 and 320 are just for illustration and not used to limit the scope of the present disclosure. People skilled in the art can make proper modification to the materials of the portions 310 and 320 according to their actual needs.

The component 130 can be a heat-dissipating film, and there is no heat-dissipating film on the section L. Specifically, the component 130 can be a copper film or a metal film, and there is no copper film or metal film on the section L. The above description does not limit this disclosure. In other embodiments, a low efficient heat-dissipating component 140 may exist on the section L.

Figure 9:
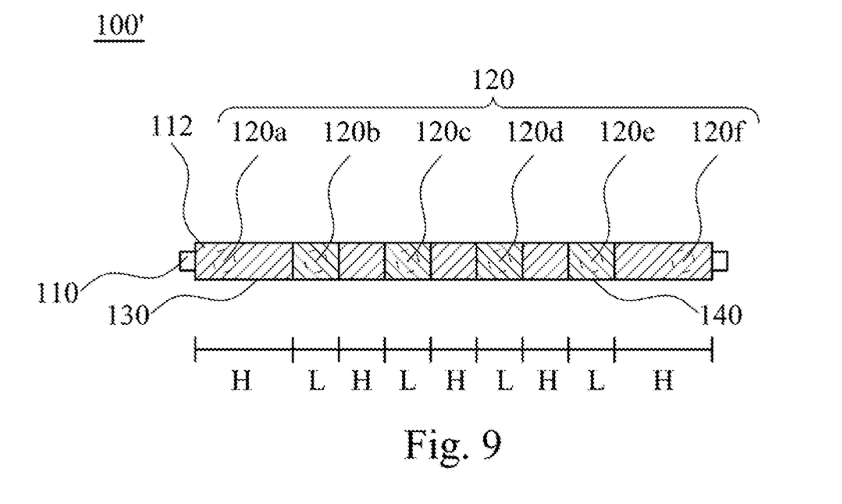
FIG. 9 is a bottom view of a light bar according to one more embodiment of the present disclosure.

As shown in FIG. 9, the light bar 100 of FIG. 9 further includes a low efficient heat-dissipating component 140 disposed on the section L. The component 130 and the component 140 are both heat-dissipating films such as a copper film or a metal film, and the thickness of the component 130 is greater than that of the component 140, so that the heat efficiency of the section H is better than that of the section L. Specifically, the thickness of the component 130 can be 0.02~0.04 mm, and the thickness of the component can be 0~0.02 mm. The thickness difference between the component 130 and the component 140 results in a mass difference per square inch, and the mass difference is approximately smaller than one ounce.

For the embodiments shown in FIG. 6~FIG. 9, the following description discloses experimental data of one embodiment to prove that the light bar 100' shown in FIG. 6~FIG. 9 can indeed reduce the temperature differences between each of the light sources 120. The parameters mentioned in the above embodiments will not be described in the followings.

First, turn on the light bar 100' of FIG. 7 installed in the direct type backlight module, wherein the components 130 are all copper films. In the present embodiment, the thickness of each component 130 is 0.02 mm. The length of each section H is 31 mm. The distinction between the present embodiment and the comparative embodiment is that both the sections H and the sections L on the second surface 112 of the wiring substrate 110 are covered by a copper film with thickness of 0.02 mm. In the present and comparative embodiments, the light sources 120 are LEDs with a model name 3030 and manufactured by Everlight Electronics Co., Ltd. the width and length of the LEDs are both 3 mm, the power of the LEDs is 1.4 W, and the current passing through each LED is 0.4 A. The material of the portion 310 is iron. The material of the portions 320 is plastic. Other parameters such as dimensions, materials and specifications, etc. of both embodiments are identical. After the light sources 120 had been turned on and in a thermal equilibrium, core temperatures and pin temperatures of the light sources 120 were recorded in the following table 2:

TABLE 2

The core temperatures and pin temperatures of the light sources 120

|  |  | Light Source 120a | Light Source 120b | Light Source 120e | Light Source 120f | Environment Temperature (° C.) | Total Voltage (V) |
|---|---|---|---|---|---|---|---|
| Comparative Embodiment | Core Temperature (° C.) | 84.9 | 70.4 | 75 | 90.2 | 23 | 20.87 |
|  | Pin Temperature (° C.) | 68.1 | 53.6 | 58.2 | 73.4 |  |  |
|  | Temperature Difference (° C.) |  | 14.5 |  | 15.2 |  |  |
| Present Embodiment | Core Temperature (° C.) | 91.1 | 88.9 | 87.9 | 89.9 | 22.6 | 20.92 |
|  | Pin Temperature (° C.) | 74.3 | 72.1 | 71.1 | 73.1 |  |  |
|  | Temperature Difference (° C.) |  | 2.2 |  | 2 |  |  |

Table 2 shows that the above embodiments can actually reduce the temperature differences between each of the light sources 120. Therefore, the bending problem of the wiring substrate 110 resulted from inhomogeneous thermal deformations can definitely be improved.

By design of the high efficient heat-dissipating section H and the low efficient heat-dissipating section L, this disclosure respectively adjusts heat-dissipating efficiencies of the high efficient heat-dissipating section H and the low efficient heat-dissipating section L according to distinct characteristics of the back plate 200 and 300, so as to regulate the temperature differences between different areas of the light bar 100 or 100'. Therefore, bending of the substrate, induced deflection of LED illuminating directions, and inhomogeneous brightness problem of the screen can be avoided.

Although the present disclosure has been described in considerable detail with reference to certain embodiments thereof, other embodiments are possible. Therefore, their spirit and scope of the appended claims should no be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of the present disclosure provided they fall within the scope of the following claims.

What is claimed is:

1. A light bar, comprising:
a wiring substrate having a first surface and a second surface opposite to the first surface, wherein the second surface is divided into at least one high efficient heat-dissipating section and at least one low efficient heat-dissipating section;
a plurality of light sources respectively disposed on the first surface opposite to the high efficient heat-dissipating section and the low efficient heat-dissipating section;
at least one high efficient heat-dissipating component disposed on the high efficient heat-dissipating section; and
a low efficient heat-dissipating component disposed on the low efficient heat-dissipating section, wherein the high efficient heat-dissipating component and the low efficient heat-dissipating component are both heat-dissipating films, and a thickness of the high efficient heat-dissipating component is greater than a thickness of the low efficient heat-dissipating component.

2. The light bar of claim 1, wherein the high efficient heat-dissipating component disposed on the high efficient heat-dissipating section is a heat-dissipating film.

3. The light bar of claim 1, wherein the high efficient heat-dissipating component disposed on the high efficient heat-dissipating section is a copper film.

4. The light bar of claim 1, wherein the high efficient heat-dissipating component and the low efficient heat-dissipating component are both copper films.

5. The light bar of claim 4, wherein a thickness difference between the high efficient heat-dissipating component and the low efficient heat-dissipating component results in a mass difference per square inch, and the mass difference is approximately smaller than one ounce.

6. The light bar of claim 1, wherein the second surface has a plurality of low efficient heat-dissipating sections; the light sources are disposed in a row; and the light sources at two opposite ends of the row are respectively disposed on the first surface opposite to the low efficient heat-dissipating sections.

7. The light bar of claim 1, wherein the second surface has a plurality of high efficient heat-dissipating sections; the light sources are disposed in a row; and the light sources in a middle of the row are respectively disposed on the first surface opposite to the high efficient heat-dissipating sections.

8. A direct type backlight module, comprising:
a back plate; and
a light bar disposed on the back plate, the light bar comprising:
a wiring substrate having a first surface and a second surface opposite to the first surface, wherein the second surface is divided into at least one high efficient heat-dissipating section and at least one low efficient heat-dissipating section;
a plurality of light sources respectively disposed on the first surface opposite to the high efficient heat-dissipating section and the low efficient heat-dissipating section;
at least one high efficient heat-dissipating component disposed on the high efficient heat-dissipating section; and
a low efficient heat-dissipating component disposed on the low efficient heat-dissipating section, wherein the high efficient heat-dissipating component and the low efficient heat-dissipating component are both heat-dissipating films, and a thickness of the high efficient heat-dissipating component is greater than a thickness of the low efficient heat-dissipating component.

9. The direct type backlight module of claim 8, wherein the high efficient heat-dissipating component and the low efficient heat-dissipating component are both copper films.

10. The direct type backlight module of claim 9, wherein a thickness difference between the high efficient heat-dissipating component and the low efficient heat-dissipating component results in a mass difference per square inch, and the mass difference is approximately smaller than one ounce.

11. The direct type backlight module of claim 8, wherein the second surface has a plurality of low efficient heat-dissipating sections and high efficient heat-dissipating sections; the light sources are disposed in a row; the light sources at two opposite ends of the row are respectively disposed on the first surface opposite to the low efficient heat-dissipating sections; and the light sources in a middle of the row are respectively disposed on the first surface opposite to the high efficient heat-dissipating sections.

12. A direct type backlight module, comprising:
a back plate, wherein the back plate has at least one high efficient heat-dissipating portion and at least one low efficient heat-dissipating portion; and
a light bar disposed on the back plate, the light bar comprising:
a wiring substrate having a first surface and a second surface opposite to the first surface, wherein the second surface is divided into at least one high efficient heat-dissipating section and at least one low efficient heat-dissipating section, wherein the high efficient heat-dissipating portion contacts the low efficient heat-dissipating section, and the low efficient heat-dissipating portion contacts the high efficient heat-dissipating section;
a plurality of light sources respectively disposed on the first surface opposite to the high efficient heat-dissipating section and the low efficient heat-dissipating section; and
at least one high efficient heat-dissipating component disposed on the high efficient heat-dissipating section.

13. The direct type backlight module of claim 12, wherein the high efficient heat-dissipating component disposed on the high efficient heat-dissipating section is a heat-dissipating film.

14. The direct type backlight module of claim 12, wherein the light bar comprises:
a low efficient heat-dissipating component disposed on the low efficient heat-dissipating section, wherein the high efficient heat-dissipating component and the low efficient heat-dissipating component are both heat-dissipating films, and a thickness of the high efficient heat-dissipating component is greater than a thickness of the low efficient heat-dissipating component.

15. The direct type backlight module of claim 14, wherein the high efficient heat-dissipating component and the low efficient heat-dissipating component are both copper films.

16. The direct type backlight module of claim 15, wherein a thickness difference between the high efficient heat-dissipating component and the low efficient heat-dissipating component results in a mass difference per square inch, and the mass difference is approximately smaller than one ounce.

17. The direct type backlight module of claim 12, wherein the high efficient heat-dissipating portion is made of metal.

18. The direct type backlight module of claim 12, wherein the efficient heat-dissipating portion is made of plastic.

* * * * *